US012662020B2

(12) United States Patent
Nordholm et al.

(10) Patent No.: US 12,662,020 B2
(45) Date of Patent: Jun. 23, 2026

(54) METHOD FOR THERMAL CONDITIONING OF A THERMAL BUFFER IN A VEHICLE

(71) Applicant: VOLVO TRUCK CORPORATION, Gothenburg (SE)

(72) Inventors: Linus Nordholm, Gothenburg (SE);
Jens Samsioe, Gothenburg (SE);
Anders Magnusson, Gothenburg (SE);
Johan Bjernetun, Mölnlycke (SE);
Johan Lindberg, Gothenburg (SE);
Leo Laine, Härryda (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 912 days.

(21) Appl. No.: 17/866,174

(22) Filed: Jul. 15, 2022

(65) Prior Publication Data

US 2023/0020541 A1      Jan. 19, 2023

(30) Foreign Application Priority Data

Jul. 19, 2021    (EP) ..................................... 21186392

(51) Int. Cl.
H02J 7/00 (2026.01)
B60L 58/26 (2019.01)
(Continued)

(52) U.S. Cl.
CPC .............. B60L 58/27 (2019.02); B60L 58/26 (2019.02); B60L 2240/545 (2013.01); B60L 2240/662 (2013.01)

(58) Field of Classification Search
CPC .... B60L 58/27; B60L 58/26; B60L 2240/545; B60L 2240/662
(Continued)

(56) References Cited

U.S. PATENT DOCUMENTS 11,602,999 B1 *   3/2023   Flatland ............... G05D 1/0217
2006/0172188 A1 *   8/2006   Okuda ................ H01M 10/625
429/62

(Continued)

FOREIGN PATENT DOCUMENTS

CN        102510813 A      6/2012
CN        102815222 A     12/2012
(Continued)

OTHER PUBLICATIONS

European Communication pursuant to Article 94(3) dated Dec. 17, 2024 in corresponding European Patent Application No. 21186392. 3, 8 pages.

(Continued)

*Primary Examiner* — Alexis B Pacheco
(74) *Attorney, Agent, or Firm* — Jeffri A. Kaminski; Venable LLP

(57) ABSTRACT

A method for thermal conditioning at least one thermal buffer of a thermal system of a vehicle, the thermal system being a rechargeable energy storage system, RESS, and/or an energy transformation system comprising fuel cells, the thermal buffer having an operating window defined by the preferred operating temperature of the thermal buffer. The method includes providing predictive power utilization of the thermal buffer as a function of time, conditioning the thermal buffer in response to the predictive power utilization, such that the thermal buffer is thermally conditioned to be within the operating window of the thermal buffer. The operating window is varying as a function of the predictive power utilization over time.

17 Claims, 3 Drawing Sheets

(51) Int. Cl.
   *B60L 58/27*      (2019.01)
   *H02J 7/14*      (2006.01)

(58) Field of Classification Search
   USPC ......................................................... 320/134
   See application file for complete search history.

(56) References Cited

U.S. PATENT DOCUMENTS

| | | | |
|---|---|---|---|
| 2010/0079115 A1* | 4/2010 | Lubawy | H02J 7/14 |
| | | | 320/150 |
| 2012/0082871 A1 | 4/2012 | Simonini et al. | |
| 2012/0136535 A1* | 5/2012 | Buford | B60L 58/33 |
| | | | 701/36 |
| 2012/0158228 A1* | 6/2012 | Biondo | B60L 3/12 |
| | | | 701/22 |
| 2012/0303397 A1* | 11/2012 | Prosser | B60L 53/18 |
| | | | 705/7.12 |
| 2014/0012447 A1* | 1/2014 | Gao | B60L 58/13 |
| | | | 701/22 |
| 2014/0062371 A1* | 3/2014 | Schultz | B60L 3/0061 |
| | | | 318/471 |
| 2015/0066837 A1* | 3/2015 | Twarog | B60L 58/12 |
| | | | 706/58 |
| 2015/0100188 A1* | 4/2015 | Wagner | B60L 58/24 |
| | | | 903/903 |
| 2016/0059733 A1* | 3/2016 | Hettrich | B60L 58/27 |
| | | | 701/2 |
| 2016/0207416 A1* | 7/2016 | Gauthier | G07C 5/085 |
| 2016/0207417 A1* | 7/2016 | Gauthier | B60L 58/27 |
| 2016/0368396 A1* | 12/2016 | Konet | B60L 3/12 |
| 2017/0028978 A1* | 2/2017 | Dunlap | B60W 10/26 |
| 2017/0129359 A1* | 5/2017 | Dunlap | B60L 53/14 |
| 2017/0210390 A1* | 7/2017 | Porras | B60K 6/40 |
| 2018/0086224 A1* | 3/2018 | King | H01M 10/663 |
| 2019/0016230 A1* | 1/2019 | Wang | B60L 58/26 |
| 2019/0157882 A1* | 5/2019 | Sherback | H02J 7/0013 |
| 2020/0055406 A1 | 2/2020 | Vallender et al. | |
| 2020/0282855 A1* | 9/2020 | Slutzky | B60L 53/64 |
| 2020/0307413 A1* | 10/2020 | Nakanishi | G06N 20/00 |
| 2021/0354591 A1* | 11/2021 | Iida | B60L 53/66 |
| 2022/0074995 A1* | 3/2022 | Bharathraj | B60L 58/12 |
| 2022/0250506 A1* | 8/2022 | Goldman-Shenhar | |
| | | | G01C 21/3469 |
| 2022/0266720 A1* | 8/2022 | Hariharan | H01M 10/6569 |
| 2023/0001824 A1* | 1/2023 | Shaotran | H01M 10/633 |

FOREIGN PATENT DOCUMENTS

| | | |
|---|---|---|
| DE | 102018209446 A1 | 12/2019 |
| JP | 2011111140 A | 6/2011 |
| WO | 2016045688 A1 | 3/2016 |
| WO | 2016083529 A1 | 6/2016 |
| WO | 2018104965 A1 | 6/2018 |

OTHER PUBLICATIONS

Non Final Office Action dated May 9, 2024 in corresponding U.S. Appl. No. 17/866,218, 23 pages.
Extended European Search Report in corresponding European Application No. 21186392.3 dated Dec. 20, 2021 (9 pages).
Extended European Search Report in corresponding European Application No. 21186402.0 dated Dec. 23, 2021 (9 pages).
Chinese Office Action dated Mar. 27, 2025 in corresponding Chinese Patent Application No. 202210814571.3, 15 pages.

* cited by examiner

S12

S10

S24

S22

S20

METHOD FOR THERMAL CONDITIONING OF A THERMAL BUFFER IN A VEHICLE

TECHNICAL FIELD

The present invention relates to a method for thermal conditioning at least one thermal buffer of a thermal system in a vehicle. The invention further relates to a conditioning system for thermal conditioning at least one thermal buffer of a thermal system in a vehicle, to a vehicle, to a computer program and to a computer readable medium carrying a computer program.

BACKGROUND

A vehicle typically comprises an engine or machine for propelling the vehicle. The engine may be powered by various means, such as e.g. by a liquid or gaseous fuel in an internal combustion engine, or by electric power to an electric machine. Moreover, hybrid solutions exist in which e.g. the vehicle is propelled both by an internal combustion engine and an electric machine. In either way, an energy storage or energy transformation device, such as e.g. a battery or a fuel cell, is used to provide the energy needed in order to propel the vehicle. The energy storage or energy transformation devices may typically be comprised in an energy storage system or a fuel cell system of the vehicle.

During, or prior to, operation of the vehicle, there may be a need to precondition or condition a vehicle component or system of the vehicle, such as e.g. the energy storage system or the fuel cell system. In some examples, the user of the vehicle, or a system of the vehicle, may require information regarding the need for conditioning. Such conditioning information is typically retrieved by requesting a conditioning status of the particular vehicle component or system. Based on the conditioning status, the user of the vehicle, or the system of the vehicle, may initiate conditioning. Alternatively, the conditioning of the vehicle component or system is performed periodically, in order to have the vehicle component or system ready for operation or optimal for operation. Such periodically performed conditioning may to at least some extent imply unnecessary conditioning, as the conditioning is performed prior to actually being needed, and/or result in a vehicle component or system not being conditioned properly as the conditioning is performed at another time than needed.

The conditioning requires energy, especially conditioning of the rechargeable energy storage system or the fuel cell system, as such systems constitutes large thermal systems of the vehicle. As the available energy or power is either limited, e.g. when the vehicle is not subject to charging or fueling, and/or is associated with a cost or an environmental impact (e.g. due to component wear), reducing the energy consumption of the vehicle is a common desire.

SUMMARY

It is an object of the present invention to at least to some extent alleviate the shortcomings discussed above in relation to the conditioning of a vehicle component or system.

According to at least a first aspect of the present invention, a method for thermal conditioning at least one thermal buffer in a thermal system of a vehicle, the thermal system being a rechargeable energy storage system, RESS, and/or an energy transformation system comprising fuel cells, the thermal buffer having an operating window defined by the preferred operating temperature of the thermal buffer, is provided. The method comprises:
- providing predictive power utilization of the thermal buffer as a function of time,
- conditioning the thermal buffer in response to the predictive power utilization, such that the thermal buffer is thermally conditioned to be within the operating window of the thermal buffer, wherein the operating window is varying as a function of the predictive power utilization over time.

Hereby, energy can be saved, and/or component damage can be reduced or avoided, as the conditioning of the thermal buffer is adapted to the predictive power utilization over time. Moreover, unnecessary conditioning can be reduced or avoided.

According to at least one example embodiment, the thermal buffer is a rechargeable energy storage device, e.g. a battery, or a fuel cell.

That is, said at least one thermal buffer in the thermal system is at least one rechargeable energy storage device or battery in the RESS and/or is at least one fuel cell in the energy transformation system. The energy transformation system may be referred to as a fuel cell system. The method of the invention may be applied to one or more thermal buffers of the thermal system, such as one or more rechargeable energy storage devices or batteries and/or one or more fuel cells. Thus, said at least one thermal buffer may be a plurality of thermal buffers, simply referred to as thermal buffers of the thermal system.

By conditioning the thermal buffer in response to the predictive power utilization over time such that the thermal buffer is operating within the operating window, typically by cooling or heating, an improved conditioning of the thermal buffer is provided. Thus, the predictive power utilization over time is used as input data to the conditioning of the thermal buffer. Hereby, at least the predictive power utilization is used to vary the degree, or amount, or type, of conditioning of the thermal buffer as a function of time. Thus, as the predictive power utilization of the thermal buffer typically varies over time, the conditioning of the thermal buffer varies over time with the desired constraints of the operating window. That is, the operating window is varying as a function of the predictive power utilization over time. The operating window may be referred to as a dynamic operating window. However, the operating window may simply be defined as an operating window being a function of the predictive power utilization over time. By providing an operating window which is as a function of the predictive power utilization over time, the conditioning of the thermal buffer may be adapted to condition the thermal buffer in a certain point in time while considering the coming operating window (which is predicted as a function of the predictive power utilization over time). Stated differently, the operating window in a second point in time and which is based on the predicted power utilization may be used as input to at least partly determine the conditioning of the thermal buffer in a first point in time occurring prior to the second point in time. For example, the first point in time is the current time and the second point in time is a coming time. In more detail, the operating window which is varying as a function of the predictive power utilization over time may be used to determine an operating window in a first point in time, being a first operating window, and an operating window in a second point in time, being a second operating window. Hereby, the thermal buffer is thermally conditioned to be within the first operating window at the first point in time, wherein the conditioning at the first point in time is at least partly adapted in response to the second operating window. For example, if the predicted power utilization predicts that at the second point in time the thermal buffer will be operated at low load (or relatively low load), indicating a (relatively) lower operating window, the conditioning of the thermal buffer at the first point in time, being e.g. a point in time in which the thermal buffer is operated at a high load (or relatively high load), can be adapted such that thermal buffer is thermally conditioned to be within a lower part of the first operating window. That is, the predicted power utilization indicates that the operating window will be lower in the second point in time, and thus the thermal conditioning at the first point in time is adapted to a level in the first operating window taken the second operating window into account. Correspondingly, if the predicted power utilization indicates that at the second point in time the thermal buffer will operated at a (relatively) high load, indicating a (relatively) higher operating window, the conditioning of the thermal buffer at the first point in time, being e.g. a point int time in which the thermal buffer is operated at a (relatively) low load, can be adapted such that thermal buffer is thermally conditioned to be within a higher part of the first operating window. The operating window is typically a temperature window extending from a lower temperature limit to a higher temperature limit, as will be described later in the text. Thus, a lower part of the operating window is referring to a (temperature) level within the operating window closer to the lower temperature limit, and a higher part of the operating window is referring to a (temperature) level within the operating window closer to the higher temperature limit. Thus, the conditioning is performed in response to the predictive power utilization over time, such that the thermal buffer is thermally conditioned to be within the operating window which is varying as a function of the predictive power utilization over time. Hereby, unnecessary, or excessive or insufficient, conditioning of the thermal buffer can be reduced or even avoided, as the operating window which is varying as a function of the predictive power utilization over time, is used as input for conditioning the thermal buffer. Thus, energy may be saved and/or any wear, electrical and/or mechanical wear, related to the unnecessary activation of the conditioning can be reduced or even avoided.

The time span used in the conditioning the thermal buffer, i.e. the conditioning performed in response to the predictive power utilization over such time span, is e.g. the coming first 10 minutes, or the coming 20 minutes, or the coming 30 minutes of operation of the thermal buffer. For example, the time span is 0-10 minutes, 0-20 minutes, or 0-30 minutes. Thus, the terms "function of time" and "over time" are used interchangeably throughout the application text for referring to such time span, and it is typically related to the operation of the thermal buffer, or predicted utilization power of the thermal buffer, over such time span.

According to at least one example embodiment, the operating window is at least a predicted operating window being a function of the predictive power utilization over time. According to at least one example embodiment, the operating window comprises a current operating window and predicted operating window. Thus, conditioning of the thermal buffer is performed in response to the current operating window being a function of predictive power utilization at the current time, and the predicted operating window being a function of predictive power utilization over time. Throughout the text, the terms "operating window" and "predicted operating window" are used interchangeably for referring to the operating window being a function of the predictive power utilization over time.

According to at least one example embodiment, conditioning the thermal buffer in response to the predictive power utilization is performed as continuously conditioning the thermal buffer in response to the predictive power utilization. Thus, the method may be referred to as a method for continuous thermal conditioning of a thermal buffer in a vehicle. According to at least one example embodiment, the conditioning of the thermal buffer is performed during operation of the thermal buffer (or operation of the vehicle). Thus, continuous thermal conditioning of a thermal buffer may be performed continuously during operation of the vehicle. According to at least one example embodiment, the conditioning of the thermal buffer excludes preconditioning the thermal buffer, such preconditioning being performed prior to the operation of the vehicle. That is, according to at least one example embodiment, preconditioning of the thermal buffer is excluded from the invention. However, according to at least one example embodiment the conditioning of the thermal buffer comprises preconditioning the thermal buffer, and (continuously) conditioning the thermal buffer during operation of the thermal buffer (or operation of the vehicle).

According to at least one example embodiment, the predicted power utilization is predicted or estimated power usage of the thermal buffer. The power usage typically comprises predicted power charge and/or discharge of the thermal buffer. Thus, the predictive power utilization may comprise estimations of the used power and the generated power of the thermal buffer. The predictive power utilization typically comprises, or may be used to determine, expected temperature, and expected temperature variations of the thermal buffer related to the predicted operation of the thermal buffer. Such expected temperature and expected temperature variations may be used as input data to set the operating window and how it varies as a function of the predictive power utilization over time. According to at least one example embodiment, the predictive power utilization is used as input data to set the operating window of the thermal buffer over time. Ambient temperature may furthermore be used as input data to the expected temperature, and expected temperature variations of the thermal buffer, and/or for the operating window of the thermal buffer, and thus used as input data in the conditioning of the thermal buffer.

According to at least one example embodiment, the ambient temperature of the thermal buffer is measured, and/or estimated. Such ambient temperature is typically an ambient temperature of the vehicle. According to at least one example embodiment, the expected ambient temperature over time of the predicted power utilization is determined or estimated. That is, the expected ambient temperature over time. Such ambient temperature and/or expected ambient temperature may be included when determining the operating window of the thermal buffer over time.

According to at least one example embodiment, conditioning the thermal buffer in response to the predictive power utilization comprises heating and cooling the thermal buffer.

Hereby, the conditioning of the thermal buffer may be performed in an efficient way.

According to at least one example embodiment, the method comprises the step of determining whether the thermal buffer is in need of cooling or heating in order to be operated within the operating window or predicted operating window. For example, the cooling or heating needed to reach a certain temperature level within the operating window. By determining whether the thermal buffer is in need of cooling or heating, and subsequently performing conditioning by cooling or heating in response to determining whether cooling or heating is to be achieved, a versatile and efficient method for thermal conditioning the thermal buffer is provided. For example, by conditioning the thermal buffer by means of heating, the thermal buffer is conditioned to be within the operating window such that the operational performance of the thermal buffer is improved. By conditioning the thermal buffer by means of cooling, the thermal buffer is conditioned to be within the operating window such that the thermal buffer is prevented from being damaged due to e.g. an excessive heat exposure.

For example, if a vehicle in which the thermal system is an RESS comprising batteries or supercapacitors, and the thermal buffer is at least one of such batteries or supercapacitors, and the predicted power utilization comprises a predicted high-power charging occurrence, conditioning the thermal buffer by cooling in order to prepare for such predicted high-power charging may be achieved.

According to at least one example embodiment, heating and cooling the thermal buffer is carried out by alternately heating and cooling the thermal buffer.

Hereby, operation inside the operating window of the thermal buffer is achieved in an efficient manner. Moreover, reaching a specific temperature level within the operating window is facilitated.

According to at least one example embodiment, heating and cooling the thermal buffer is carried out by actively heating and actively cooling the thermal buffer, respectively.

Hereby, the desired conditioning may be achieved quickly. Heating may for example be performed by a heater or a heating device, and cooling may be performed by a cooler or a cooling device. Actively heating may thus comprise providing external heat from outside of the thermal buffer. Actively cooling may thus comprise actively removing heat by heat exchanging with an external heat source of the thermal buffer.

According to at least one example embodiment, conditioning the thermal buffer in response to the predictive power utilization comprises intentionally allowing the thermal buffer to self-heat or self-cool for a predetermined time period.

Hereby, an alternative to the actively heating and actively cooling of the thermal buffer is provided. Allowing the thermal buffer to self-heat or self-cool is typically requiring less energy compared to actively heating or actively cooling the thermal buffer.

According to at least one example embodiment, the method further comprises:

determining a first point in time, or a first time interval, in which the thermal buffer is in need of heating in order to be within the operating window of the thermal buffer, and determining a second point in time, or a second time interval, in which the thermal buffer is in need of cooling in order to be within the operating window of the thermal buffer.

The second point in time is occurring after the first point in time, and the second time interval is separate and subsequent to the first time interval. Thus, in response to such determination, conditioning of the thermal buffer by heating at the first point in time, or in the first time interval, and by cooling at the second point in time, or in the second time interval, may be achieved. As previously described, the conditioning of the thermal buffer in the first time interval is typically at least partly based on the predicted operating window in the second time internal. Thus, as cooling is needed in order to be within the operating window of the thermal buffer in the second time interval, less heat is typically provided during the conditioning by heating in the first time interval. That is, in the first time interval, heating is provided such that the operating window within the first time interval is reached, but the specific level (temperature level) within the operating window is set to be in the lower part of the operating window as cooling of the thermal buffer is predicted to be needed in the second time interval. Hence, conditioning of the thermal buffer by heating during the first time interval is achieved such that the specific level (temperature level) is in the lower part of the operating window. The first time interval and the second time interval are typically time intervals within the previously described time span.

According to at least one example embodiment, the predictive power utilization is comprised in scheduled operational information of the thermal buffer.

The scheduled operational information may comprise scheduled operational load of the thermal buffer during the scheduled operation of the vehicle. The scheduled operational information may comprise scheduled initialization time of operating the vehicle, and scheduled charging occurrences of the thermal buffer. According to at least one example embodiment, the scheduled operational information comprises the scheduled operation of the thermal buffer, such as e.g. the scheduled operational load over time, such as e.g. during a drive cycle or a work/load cycle of the vehicle, or at least for the scheduled operation of the thermal buffer over the time span as previously described. Thus, the operating window of the thermal buffer may be set in accordance with, or in response to, the scheduled operational load of the schedule operational information, wherein the operating window is to be reached at a time in accordance with predicted operation load by conditioning the thermal buffer. According to at least one example embodiment, the scheduled operational information of the thermal buffer is set by a user or a system.

According to at least one example embodiment, the predictive power utilization of the thermal buffer is predicted in response to a scheduled route of the vehicle comprising scheduled auxiliary actions of performing work during at least a portion of the scheduled route.

Hereby, the auxiliary actions of performing work may be comprised in the predictive power utilization and thus, the operating window of the thermal buffer and the conditioning of the thermal buffer. Thus, the scheduled operational information may comprise said scheduled route of the vehicle comprising scheduled auxiliary actions of performing work during at least a portion of the scheduled route. The auxiliary actions of performing work may e.g. be at least one of loading, carrying a load, dumping a load, digging, drilling, and lifting. The auxiliary actions of performing work may e.g. be powered by a power take off, PTO.

According to at least one example embodiment, the predicted temperature of the thermal buffer, and/or the operating window or predicted operating window of the thermal buffer, is based on a mathematical model of the predicted power utilization, or predicted power usage (power charge and/or discharge). The mathematical model may e.g. represent the behaviour of the thermal buffer during operation of the thermal buffer over time, e.g. based on empirical data and/or estimations, and preferred temperature limits in response to such operation. The mathematical model utilizes the predicted power utilization, which is for example based on scheduled route, predicted road, traffic and/or weather conditions, internal or external parameters of the vehicle, e.g. internal parameters of the thermal buffer, parameters of the drive cycle and/or work/load cycle, parameters of the environment to the vehicle, and provides output data, wherein at least the output data comprises an output parameter representing the operating window of the thermal buffer over time. According to at least one example embodiment, the thermal model utilizes known temperature characteristics of the thermal buffer to estimate the temperature or operating window of thermal buffer over time. Typically, the ambient temperature and/or expected ambient temperature are input parameters to such thermal model.

According to at least one example embodiment, the operating window has a lower temperature limit and an upper temperature limit, and the lower and upper temperature limits are varying as a function of the predictive power utilization over time.

Thus, the operating window may vary over time as the lower and/or upper temperature limits are varying over time. According to at least one example embodiment, at least two upper temperature limits and/or at least two lower temperature limits are used to define the operating window. For example, first upper and lower temperature limits may represent the normal operation of the thermal buffer, while second upper and lower temperature limits may represent stretched, or the critical operation of the thermal buffer. Any of these operating temperatures may be the preferred operating temperature setting a preferred operating window.

According to at least one example embodiment, a maximum or critical upper temperature limit of the thermal buffer is provided, the maximum or critical upper temperature limit may be a fixed temperature limit. Such maximum or critical upper temperature limit may not be exceeded due to a high risk of component failure. The previously described second upper temperature limit may be such maximum or critical upper temperature limit. According to at least one example embodiment, a minimum or critical lower temperature limit of the thermal buffer is provided, the minimum or critical lower temperature limit may be a fixed temperature limit. Such minimum or critical lower temperature limit may not be exceeded due to a high risk of component failure or component to being able to operate. The previously described second lower temperature limit may be such minimum or critical lower temperature limit.

According to at least one example embodiment, the thermal system is simply referred to as a rechargeable energy storage system, RESS, comprising rechargeable energy storage devices (as e.g. batteries or supercapacitors) and/or an energy transformation system comprising fuel cells. Thus, the thermal system may be referred to as a RESS and/or a fuel cell system. Alternatively, the thermal system is referred to as an energy storage and/or transformation system. The RESS and/or the energy transformation system may be comprised of several components or sub-systems, each acting as a thermal buffer. According to at least one example embodiment, such thermal buffers within the RESS and/or the energy transformation system may be considered as a whole, and the RESS and/or the energy transformation system may simply be referred to as the thermal buffer. According to at least one example embodiment, the thermal buffer being the RESS and/or the energy transformation system, is at least one thermal buffer, such as e.g. a plurality of thermal buffers within the RESS and/or the energy transformation system.

According to at least one example embodiment, the method further comprises:
    determining the conditioning status of the thermal buffer.
        The conditioning status may comprises at least a current temperature of the thermal buffer. Thus, the need of cooling or heating to reach the operating window, or a specific level within the operating window, may be at least partly based, or may be at least partly carried out in response to, the current temperature of the thermal buffer. Typically, the predicted power utilization, or the predicted operating window, of the thermal buffer related to the predicted power utilization, as well as the ambient temperature, or predicted ambient temperature, are used as input to determine the need of cooling or heating to reach the operating window, or a specific level within the operating window. Hereby, an improved conditioning can be achieved as the current temperature of the thermal buffer and the operating window or predicted operating window of the thermal buffer related to the predicted power utilization over time are taken into account to the need for the conditioning. Thus, unnecessary conditioning can be avoided. The operating window is furthermore typically hardware dependent and set in response to the characteristics of the thermal buffer. According to at least one example embodiment, the operating window is adapted to the preferred temperature variations of the thermal buffer in accordance with the predicted power utilization. Thus, by comparing the conditioning status of the thermal buffer, at least the current temperature of the thermal buffer, with operating window or predicted operating window of the thermal buffer, it can be determined whether the thermal buffer is in need of cooling or heating in order to reach the operating window or a specific level within the operating window. Stated differently, the current temperature of the thermal buffer and the operating window or predicted operating window are used as input data when determining whether the thermal buffer is in need of cooling or heating in order to reach the operating window or a specific level within the operating window (at a specific point in time).

According to a second aspect of the invention, a conditioning system for thermal conditioning at least one thermal buffer of a thermal system of a vehicle, the thermal system being a rechargeable energy storage system, RESS, and/or an energy transformation system comprising fuel cells, the thermal buffer having an operating window defined by the preferred operating temperature of the thermal buffer, is provided. The conditioning system comprises:
    a control unit configured to provide predictive power utilization of the thermal buffer as a function of time,
    a conditioning unit configured to condition the thermal buffer in response to the predictive power utilization, such that the thermal buffer is thermally conditioned to be within the operating window of the thermal buffer, wherein the operating window is varying as a function of the predictive power utilization over time.

Effects and features of the second aspect of the invention are largely analogous to those described above in connection with the first aspect of the invention. Embodiments mentioned in relation to the first aspect of the invention are largely compatible with the second aspect of the invention, of which some are exemplified below, typically without repetition of any technical effect.

Thus, and according to at least one example embodiment, the thermal buffer is a rechargeable energy storage device, e.g. a battery, or a fuel cell. That is, said at least one thermal buffer in the thermal system is at least one rechargeable energy storage device or battery in the RESS and/or is at least one fuel cell in the energy transformation system. The energy transformation system may be referred to as a fuel cell system. The conditioning system of the invention may be applied to one or more thermal buffers of the thermal system, such as one or more rechargeable energy storage devices or batteries and/or one or more fuel cells.

According to at least one example embodiment, the conditioning unit is configured to condition the thermal buffer by alternately heating and cooling the thermal buffer.

According to at least one example embodiment, the conditioning unit is configured to actively heat and actively cool the thermal buffer, respectively. Thus, the conditioning unit may comprise a heater configured to provide external heat from outside of the thermal buffer, and/or a cooler configured to actively remove heat by heat exchanging with an external heat source of the thermal buffer.

According to at least one example embodiment, the control unit is further configured to:

determine a first point in time, or a first time interval, in which the thermal buffer is in need of heating in order to be within the operating window of the thermal buffer, and determine a second point in time, or a second time interval, in which the thermal buffer is in need of cooling in order to be within the operating window of the thermal buffer The second point in time is occurring after the first point in time, and the second time interval is separate and subsequent to the first time interval. As described with reference to the first aspect of the invention, in response to such determination, the conditioning unit is configured to condition the thermal buffer by heating at the first point in time, or in the first time interval, and by cooling at the second point in time, or in the second time interval. As previously described, the conditioning of the thermal buffer in the first time interval is typically at least partly based on the predicted operating window in the second time internal. Thus, as cooling is needed in order to be within the operating window of the thermal buffer in the second time interval, less heat is typically provided during the conditioning by heating in the first time interval. That is, in the first time interval, heating is provided such that the operating window within the first time interval is reached, but the level (temperature level) within the operating window is set to be in the lower part of the operating window as cooling of the thermal buffer is predicted to be need in the second time interval. Hence, conditioning of the thermal buffer by heating during the first time interval is achieved such that the level (temperature level) is in the lower part of the operating window. The first time interval and the second time interval are typically time intervals within the previously described time span.

According to at least one example embodiment, the control unit is further configured to determine the conditioning status of the thermal buffer, the conditioning status comprises at least a current temperature of the thermal buffer. Thus, the need of cooling or heating to reach the operating window or a specific level within the operating window is determined in response to at least the current temperature of the thermal buffer.

According to at least one example embodiment the control unit is further configured to determine or estimate the ambient temperature of the thermal buffer and/or the expected ambient temperature over time of the predicted power utilization, and/or over the previously mentioned scheduled operation information.

According to at least one example embodiment, the conditioning system further comprises:

an operating window estimation unit configured to estimate operating window in response to the predictive power utilization of the thermal buffer as a function of time.

Thus, the operating window estimation unit may be configured to estimate the operating window over time in response to the predictive power utilization or power usage of the thermal buffer as described with reference to the first aspect of the invention, e.g. by using a thermal model, or heat transfer model, of the thermal buffer. The operating window estimation unit may according to at least one example embodiment be comprised in the control unit, and hence, constitute corresponding functions of the control unit. The power usage may comprise the power charge and/or discharge of the predicted power utilization over time or scheduled operation of the thermal buffer.

According to at least one example embodiment, the control unit is further configured to instruct the conditioning unit to cool the thermal buffer towards the operating window or specific level within the operating window in response of determining that the thermal buffer is in need of cooling.

According to at least one example embodiment, the control unit is further configured to instruct the conditioning unit to heat the thermal buffer towards the operating window or specific level within the operating window in response of determining that the thermal buffer is in need of heating.

That is, the thermal conditioning unit comprises at least the functionality to heat the thermal buffer, e.g. by comprising a heater.

According to a third aspect of the invention, a vehicle comprising the conditioning system according to the second aspect of the invention is provided.

Effects and features of the third aspect of the invention are largely analogous to those described above in connection with the first and second aspects of the invention. Embodiments mentioned in relation to the first and second aspects of the invention are largely compatible with the third aspect of the invention, of which some are exemplified below.

According to at least one example embodiment, the vehicle comprises a power take off, PTO, and an auxiliary action equipment configured to achieve auxiliary actions of performing work, such as e.g. at least one of loading, carrying a load, dumping a load, digging, drilling, and lifting According to at least one example embodiment, the vehicle further comprises the thermal system being a rechargeable energy storage system, RESS, comprising batteries or supercapacitors, and/or being an energy transformation system comprising fuel cells. Thus, the vehicle may be an electric vehicle, or a hybrid vehicle.

According to a fourth aspect of the invention, a computer program comprising program code means for performing the method according to the first aspect of the invention, when the program is run on a computer, is provided.

According to a fifth aspect of the invention, a computer readable medium carrying a computer program comprising program code means for performing the method according to the first aspect of the invention, when the program is run on a computer, is provided.

Effects and features of the fourth and fifths aspects of the invention are largely analogous to those described above in connection with the first aspect of the invention. Embodiments mentioned in relation to the first aspect of the invention are largely compatible with the fourth and fifth aspects of the invention.

The order of the method steps described in the present disclosure is not constrained to that described in the first aspect of the invention. One or several of the steps could switch places, or occur in a different order without departing from the scope of the invention. However, according to at least one example embodiment, the method steps are performed in the consecutive order described in the first aspect of the invention.

Further advantages and features of the present disclosure are disclosed and discussed in the following description and the accompanying drawings.

BRIEF DESCRIPTION OF THE DRAWINGS

With reference to the appended drawings, below follows a more detailed description of embodiments of the invention cited as examples. In the drawings.

DETAILED DESCRIPTION OF EXAMPLE EMBODIMENTS OF THE INVENTION

Figure 1:
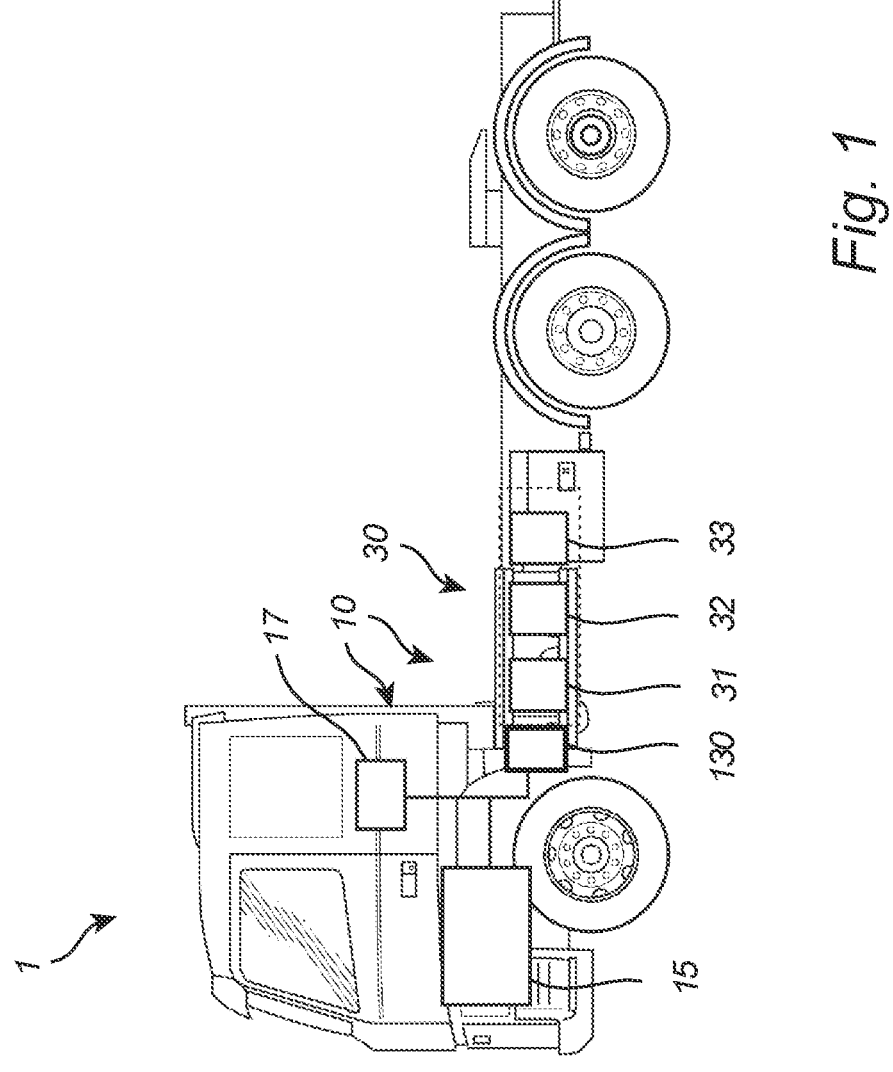
FIG. 1 is a schematic side view of a vehicle comprising a conditioning system for thermal conditioning a thermal buffer in a vehicle, in accordance with example embodiments of the invention.

With reference to FIG. 1, a vehicle 1, here embodied as a heavy duty truck 1, is disclosed for which a method and a conditioning system 10 for thermal conditioning at least one thermal buffer 31, 32, 33 of a thermal system 30 of a kind disclosed in the present invention are advantageous. However, the method and the conditioning system 10 may as well be implemented in other types of vehicles, such as in busses, light-weight trucks, passenger cars, marine applications (e.g. in a vessel) etc. The vehicle 1 is an electric vehicle, such as a full electric vehicle or a hybrid, comprising at least one electric machine 15. In FIG. 1, the thermal system 30 is a rechargeable energy storage system, RESS, such as e.g. a battery system, or is a fuel cell system, which is configured to power the electric machine 15. In the example of FIG. 1, the thermal system 30 comprises three energy storage or transformation devices 31, 32, 33, such as e.g. battery packs 31, 32, 33, being thermal buffers 31, 32, 33 of the thermal system 30. The conditioning system 10 may comprise a control unit 17 and a thermal conditioning unit 130, the control unit 17 being configured to control thermal conditioning of at least one of the thermal buffers 31, 32, 33 by means of the thermal conditioning unit 130, and possibly configured to control the operation of the thermal system 30. The vehicle 1 typically further comprises other parts of the powertrain such as transmission, drive shafts and wheels (not shown in detail).

Figures 2, 3:
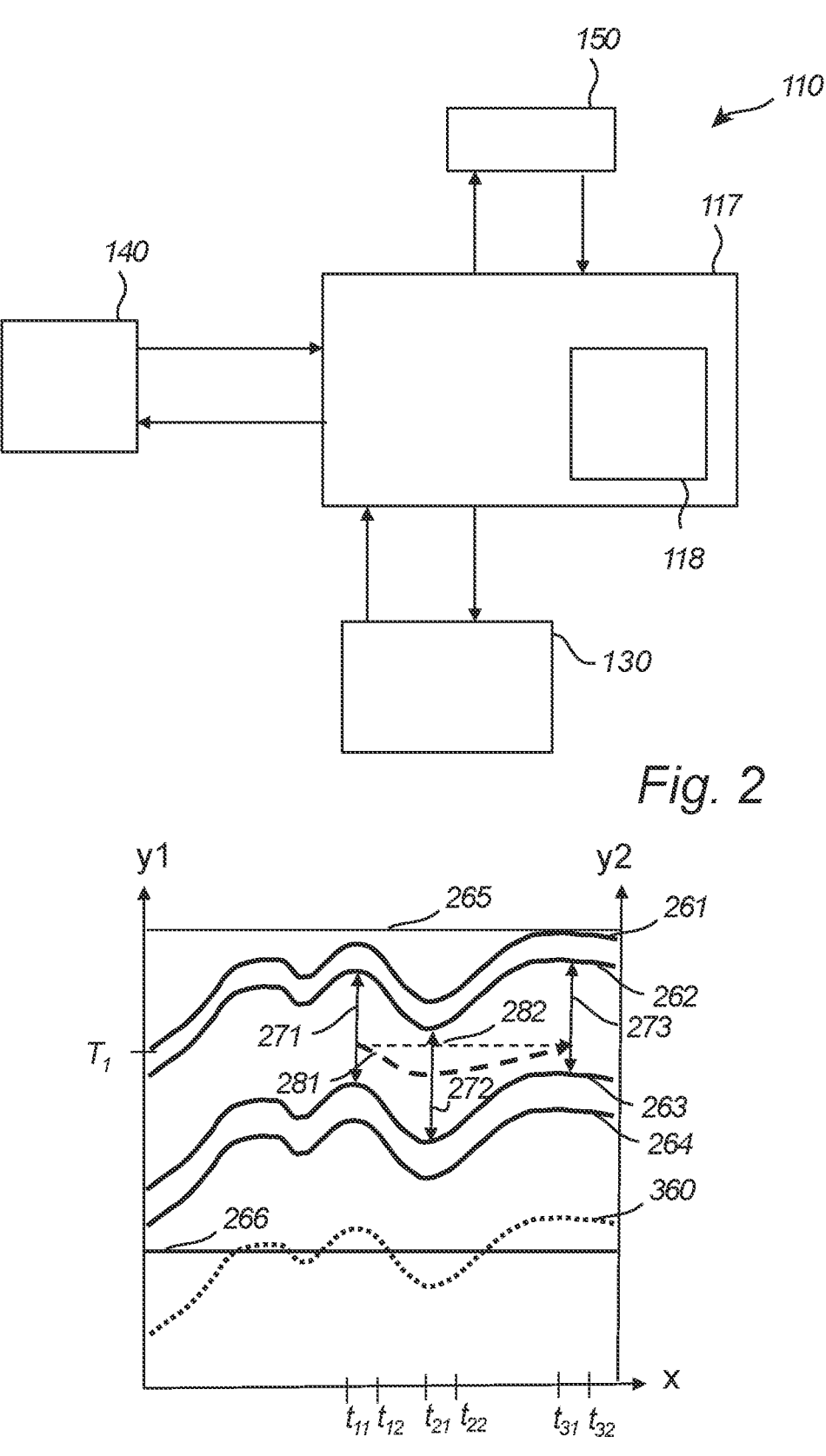
FIG. 2 is a schematic view of a conditioning system for thermal conditioning a thermal buffer comprising at least a control unit and a thermal conditioning unit, in accordance with an example embodiment of the invention.
FIG. 3 is a graph showing the precondition of a thermal buffer for various different scheduled operational information of the thermal buffer.

FIG. 2 is a schematic view of a conditioning system 110 comprising a control unit 117 and various vehicle components and systems interacting with the control unit 117. The embodiment shown in FIG. 2 may be implemented in the vehicle 1 of FIG. 1. The conditioning system 110 comprises a thermal conditioning unit 130 configured to condition a thermal buffer (such as at least one of the thermal buffers 31,

32, 33 of FIG. 1), and a predictive operation unit 140 configured to directly or indirectly provide predictive power utilization of the thermal buffer over time to the control unit 117 and the thermal conditioning unit 130. In the embodiment of FIG. 2, a parameter providing unit 150 configured to provide parameter data, such as e.g. external parameter data, is also comprised in the conditioning system 110, and an operating window estimation unit 118 is comprised in the control unit 117. Moreover, in FIG. 2, the operating window estimation unit 118 is forming an integral part of the control unit 117, but it may as well be arranged as a separate unit relative to the control unit 117 or be comprised in the predictive operation unit 140. Thus, the control unit 117 is configured to interact with the thermal conditioning unit 130, the predictive operation unit 140, the parameter providing unit 150 and the operating window estimation unit 118.

The control unit 117 is configured to provide predictive power utilization of the thermal buffer, e.g. by receiving such information by the predictive operation unit 140. Thus, the predictive operation unit 140 may according to one example embodiment supply predictive power utilization of the thermal buffer over time, e.g. as scheduled operational information of the thermal buffer, the scheduled operational information comprising scheduled operational load of the thermal buffer as a function of time. Moreover, the control unit 117 is configured to instruct the thermal conditioning unit 130 to condition the thermal buffer in response to the predictive power utilization such that the thermal buffer is thermally conditioned to be within an operating window of the thermal buffer. The conditioning unit 130 typically comprises means for actively heating and actively cooling the thermal buffer, e.g. a heater or a cooler (e.g. a heat exchanger) and/or means for passively heating and passively cooling (i.e. the functionality of intentionally allowing the thermal buffer to self-heat or self-cool for a predetermined time period). The operating window of the thermal buffer is varying as a function of the predictive power utilization over time, as will be described later. Thus, the control unit 117 is configured to instruct the thermal conditioning unit 130 to vary the conditioning of the thermal buffer in response to a varying operating window over time. The operating window is defined by the preferred operating temperature of the thermal buffer over time. The control unit 117 may be further configured to determine whether the thermal buffer is in need of cooling or heating in order to reach the operating window or a specific temperature level within the operating window. The operating window may e.g. be determined by utilizing the operating window estimation unit 118 which is configured to estimate the operating window of the thermal buffer based on the predictive power utilization over time. Alternatively, the operating window is provided by the predictive operation unit 140. The operating window is typically based on the preferred temperature range, or preferred temperature variations, of the thermal buffer related to the predictive power utilization over time. For example, the operating window is corresponds to temperature range adapted with regards to e.g. component life, performance etc. The operating window estimation unit 118 may comprise, or be configured to implement, a thermal model, or heat transfer model, of the thermal buffer, and the temperature of the thermal buffer can be determined or estimated based on the thermal model together with the predicted power utilization. The thermal model may typically utilize known temperature characteristics of the thermal buffer to estimate the temperature of thermal buffer. That is, the control unit 117, or operating window estimation unit 118, typically comprises a computer program comprising program code means for at least executing the thermal model, and possibly storing the thermal model. The ambient temperature may as well be used in determining the operating window, or predicted operating window, of the thermal buffer, and e.g. be used as input data to the thermal model. For example, the parameter providing unit 150 may e.g. be a sensor, such as a temperature sensor, configured to measure the ambient temperature of the thermal buffer and/or vehicle. Additionally, or alternatively, a conditioning status of the thermal buffer may be determined by the control unit 117, the conditioning status comprises at least a current temperature of the thermal buffer. For example, the need of cooling or heating in order to reach the operating window or a specific level within the operating window, may be based on the conditioning status of the thermal buffer, or current temperature of the thermal buffer, and the operating window or predicted operating window, of the thermal buffer related to the predicted power utilization over time.

The predictive operation unit 140 may e.g. be integrated into a vehicle functionality of automatically or periodically conditioning of the thermal buffer, and/or may be a user-input device configured to enable a manual functionality of providing information related to the predictive power utilization over time (e.g. scheduled operational information of the thermal buffer). The user-input device may e.g. be a vehicle display or a user device, such as e.g. a mobile phone or tablet. The predictive operation unit 140 can for example be a mobile app, in vehicle cluster or an offboard vehicle management system. However, it should be noted that the predictive operation unit 140, the parameter providing unit 150, and the operating window estimation unit 118 are optional. Thus, the predictive power utilization of the thermal buffer may be provided from something else than the predictive operation unit 140, and the thermal conditioning may be operable without the input from the parameter providing unit 150 and the operating window estimation unit 118.

With reference to FIG. 2, the following example procedure may be carried out when thermally conditioning the thermal buffer.

A user (not shown) uses the predictive operation unit 140 to set the usage need of the vehicle. For example, the usage need includes information to when the vehicle is to be used, corresponding to a scheduled initialization time, and for what the vehicle is to be used for, corresponding to a schedule operational load over time. For example, the user may set a planned or scheduled route, and/or desired destination, possibly together with scheduled auxiliary actions of performing work during at least a portion of the scheduled route. As an example, such usage need may be that the vehicle is to be utilized for performance driving at 08:00 tomorrow, directly thereafter driving on the highway to a first destination, and when reaching the first destination utilizing PTO (i.e. for auxiliary actions of performing work). Depending on the level of details of the usage need, it may be used as input data to determine the predictive power utilization over time of the thermal buffer, and/or it may be used directly to determine the predictive power utilization of the thermal buffer over time. For example, the usage need may be pre-processed, e.g. by including topography of the scheduled route, predicted road, traffic and/or weather conditions, and other internal or external parameters e.g. parameters of the thermal buffer, parameters of the drive cycle and/or work/load cycle, parameters of the environment to the vehicle, to determine the predictive power utilization of the thermal buffer over time. Such pre-processing may be performed by the control unit 117, and/or when determining the operating window by the operating window estimation unit 118 as described below.

Thus, the control unit 117 receives and/or provides the predictive power utilization of the thermal buffer over time. Subsequently, the predictive power utilization of the thermal buffer may be sent as input to the operating window estimation unit 118 to estimate operating window as a function of predictive power utilization over time. Typically, the predicted power utilization comprises the power usage of the thermal buffer including power charge and/or discharge corresponding to e.g. scheduled operational information of the thermal buffer. The operating window, or predicted operating window, from the operating window estimation unit 118 may subsequently be used as input to the thermal conditioning unit 130, the thermal conditioning unit be configured to condition the thermal buffer in response to the predictive power utilization, such that the thermal buffer is thermally conditioned to be within the operating window of the thermal buffer. For example, the thermal buffer is thermally conditioned by cooling or heating to be within the operating window, or a specific level within the operating window, in accordance with the predictive power utilization, and how the predictive power utilization varies over time.

An example result of conditioning the thermal buffer in accordance with the predicted power utilization over time and the operating window is presented in FIG. 3. FIG. 3 is a graph showing the temperature (y1-axis) and predicted power utilization (y2-axis) as a function of time (x-axis). The solid lines 261, 262, 263, 264, 265, 266 represent temperature limits of the thermal buffer, and the dotted line 360 represents the predicted power utilization of the thermal buffer over time. In FIG. 3, a first upper temperature limit 262 and a first lower temperature limit 263 define the operating window 271, 272, 273 of the thermal buffer. Thus, the first upper and lower temperature limits 262, 263 are in this example embodiment the preferred upper and lower temperature limits of the operating window 271, 272, 273. The first upper and lower temperature limits 262, 263 may e.g. define the normal operating temperature limits of the thermal buffer. As can be seen in FIG. 3, the operating window 271, 272, 273, and the first upper and lower temperature limits 262, 263 vary over time in a corresponding manner to the predictive power utilization 360. That is, the first upper and upper temperature limits 262, 263 are varying as a function of the predictive power utilization 360 over time.

At a first point in time t11, or alternatively during a first time interval t12–t11, a first operating window 271 is defined, and at a second point in time t21, or alternatively during a second time interval t22–t21, a second operating window 272 is defined, and at a third point in time t31, or alternatively during a third time interval t32–t31, a third operating window 273 is defined. Even though the first, second and third points in time, t11, t21, t31 are mainly used in the following, the method may as well be implemented using the first, second and third time intervals. By providing an operating window 271, 273, 273 which is as a function of the predictive power utilization 360 over time, the conditioning of the thermal buffer may be adapted to condition the thermal buffer in a certain point in time, e.g. the first point in time t11, while considering the coming operating window 272, 273, here being at the second and third points in time t21, t31. Stated differently, the operating window 272 at the second point in time t21, and/or the operating window 273 at the third point in time t31, is used as input to at least partly determine the conditioning of the thermal buffer at the first point in time t11. That is, at the first point in time t11, the conditioning of the thermal buffer is achieved such that the thermal buffer is thermally conditioned to be within the first operating window 271, and is furthermore achieved to reach a specific temperature level T1 within the operating window 271. Such specific temperature level T1 is determined in response to the coming operating window 272, 273.

For example, as seen in FIG. 3, if the predicted power utilization predicts that at the second point in time t21, the thermal buffer will operated at a lower load (lower power) than at the first point in time t11 (i.e. the load is relatively lower), indicating a lower second operating window 272 as compared to the first operating window 271 at the first point in time t11, the conditioning of the thermal buffer at the first point in time t11 is adapted such that the thermal buffer is thermally conditioned to be within a lower part of the first operating window 271, i.e. the specific temperature level T1. That is, the predicted power utilization indicates that the operating window 272 will be lower at the second point in time t21, and thus the thermal conditioning at the first point in time t11 is adapted to a level in the first operating window 271, taking the second operating window 272 into account. Correspondingly, if the predicted power utilization predicts that at the third point in time t31, the thermal buffer will operate again at a relatively high load (e.g. the same or even higher than at the first point in time t11), indicating a higher third operating window 273, the conditioning of the thermal buffer at the first point in time t11, can be adapted to also take the third operating window 273 into account.

Thus, in the example of FIG. 3, at the first point in time t11, or at the first time interval t12–t11, the thermal buffer is in need of heating in order to be within the first operating window 271 of the thermal buffer, considering the lower operating window prior to the first point in time t11. Moreover, at the second point in time t21, or at the second time interval t22–t21, the thermal buffer is in need of cooling in order to be within the second operating window 272 of the thermal buffer, considering the lower load of the thermal buffer at the second point in time t21 as compared to in the first point in time t11. Thus, the thermal buffer may be thermally conditioned by cooling (e.g. active cooling or self-cooling), following the first temperature function 281 of the thermal buffer. However, as seen in FIG. 3, the specific temperature level within the operating window 271, 272 has changed from being at a lower part of the first operating window 271 to a specific temperature level at a higher part of the second operating window 272. Thus, less cooling of the thermal buffer has been carried out compared to if a fixed temperature level within the respective operating window 271, 272 had been used to condition the thermal buffer (i.e. a fixed temperature level here indicating a fixed distance from the first upper and/or lower temperature limits 262, 263 in the respective first and second operating window 271, 272). Further, at the third point in time t31, or at the third time interval t32–t31, the thermal buffer is again in need of heating in order to be within the third operating window 273 of the thermal buffer, considering the higher load of the thermal buffer at the third point in time t31 as compared to in the second point in time t21. Thus, the thermal buffer may be thermally conditioned by heating (e.g. active heating or self-heating), following the first temperature function 281 of the thermal buffer. However, as seen in FIG. 3, the specific temperature level within the operating window 272, 273 has changed from being at a higher part of the second operating window 272 to a specific temperature level at a lower part of the third operating window 273. Thus, less heating of the thermal buffer has been carried out compared to if a fixed temperature level within the respective operating window 272, 273 had been used to condition the thermal buffer (i.e. a fixed temperature level here indicating a fixed distance from the first upper and/or lower temperature limits 262, 263 in the respective second and third operating window). Thus, heating and cooling the thermal buffer is carried out by alternately heating and cooling the thermal buffer. Hereby, unnecessary, or excessive or insufficient, conditioning of the thermal buffer can be reduced or even avoided, as the operating window which is varying as a function of the predictive power utilization over time, is used as input for conditioning the thermal buffer.

Thus, the control unit 117 of FIG. 2 may be configured to:
determining a first point int time t11, or a first time interval t12–t11, in which the thermal buffer is in need of heating in order to be within the operating window 271 of the thermal buffer, and determining at least a second point in time t21, or a second time interval t22–t21, in which the thermal buffer is in need of cooling in order to be within the operating window 272 of the thermal buffer, wherein the second time interval is separate and subsequent to the first time interval.

As an alternative to the first temperature function 281 of the thermal buffer, the temperature level of the thermal buffer may follow a second temperature function 282 as seen in FIG. 3. Here, the conditioning is performed to simply keep the temperature steady at the specific temperature level T1. That is, the predicted power utilization 360, and the second and third operating window 272, 273, indicate that the temperature of the thermal buffer will be kept within the second operating window 272 at the second point in time t21, and within the third operating window 273 at the third point in time t31, if the temperature is kept steady at the specific temperature level T1. That is, the thermal conditioning at the first point in time t11 is adapted to a level in the first operating window 271, taking the second and third operating window 272, 273 into account. Hereby, unnecessary, or excessive or insufficient, conditioning of the thermal buffer can be reduced or even avoided, as the operating window which is varying as a function of the predictive power utilization over time, is used as input for conditioning the thermal buffer.

Thus, the operating window 271, 272, 273 which is varying as a function of the predictive power utilization 360 over time may be used to determine an operating window 271 in a first point in time t11, being a first operating window 271, and an operating window in a second point in time t21, being a second operating window 272. Hereby, the thermal buffer is thermally conditioned to be within the first operating window 271 at the first point in time, wherein the conditioning is at least partly adapted in response to the second operating window 272.

According to at least one example embodiment, the operating window is defined by other temperature limits than the first upper and lower temperature limits 262, 263. For example, a second upper temperature limit 261 and/or a second lower temperature limit 264 may be used to define the operating window. The second upper and lower temperature limits 261, 264 may e.g. define stretched temperature limits of the thermal buffer. Thus, the operating window may be defined by the first upper temperature limit 262 and the first or second lower temperature limits 263, 264, or be defined by the second upper temperature limit 261 and the first or second lower temperature limits 263, 264. Moreover, a third type of temperature limit may be used when defining the operating window, the third type being critical temperature limits 265, 266, which in FIG. 3 is represented by a critical upper temperature limit 265 and a critical lower temperature limit 266. The critical temperature limits 265, 266 are typically fixed temperature limits which defines the critical temperature limits which the thermal buffer must be operated within. Thus, the operating window may be defined by the critical upper temperature limit 265 instead of the first or second upper temperature limits 261, 262 and/or the critical lower temperature limit 266 instead of the first or second lower temperature limits 263, 264.

It should be understood that the example of FIG. 3 is a simplified representation of the conditioning of the thermal buffer for three examples of operating windows. As been described before, different ambient temperatures typically affect the conditioning and the operating windows.

Figure 4:
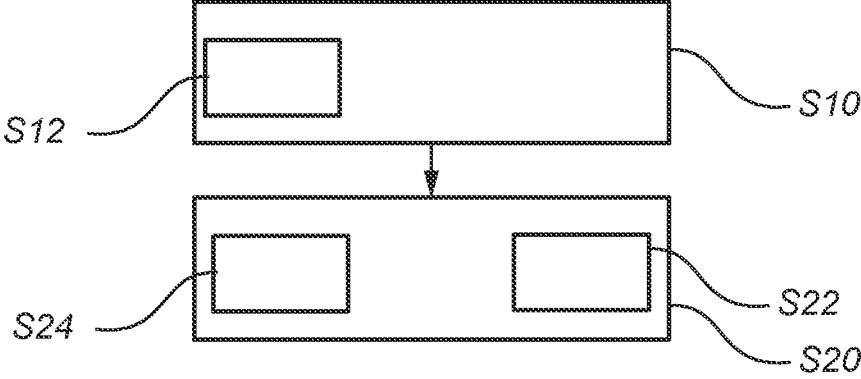
FIG. 4 is a flowchart illustrating the steps of a method in accordance with example embodiments of the invention.

A method for thermal conditioning at least one thermal buffer of a thermal system of a vehicle, the thermal system being a rechargeable energy storage system, RESS, and/or an energy transformation system comprising fuel cells, the thermal buffer having an operating window defined by the preferred operating temperature of the thermal buffer, will now be described in more general terms with additional reference to FIG. 4. FIG. 4 is a flowchart describing the steps of such method. The method may e.g. be implemented in the control unit 117 of FIG. 2, and used in the vehicle 1 of FIG. 1. Thus, the thermal buffer is typically a rechargeable energy storage device, such as a battery or a supercapacitor, of the RESS and/or is a fuel cell of the energy transformation system.

In a first step S10, predictive power utilization of the thermal buffer as a function of time is provided. Such predictive power utilization may be based on e.g. scheduled operational information of the thermal buffer, typically related to a usage need given by a user or by a system comprising scheduled information of the vehicle. The scheduled operation of the thermal buffer may comprise a scheduled route of the vehicle comprising scheduled auxiliary actions of performing work during at least a portion of the scheduled route. Thus, the predictive power utilization of the thermal buffer may be predicted in response to a scheduled route of the vehicle comprising scheduled auxiliary actions of performing work during at least a portion of the scheduled route.

In a second step S20, the thermal buffer is conditioned in response to the predictive power utilization, such that the thermal buffer is thermally conditioned to be within the operating window of the thermal buffer, wherein the operating window is varying as a function of the predictive power utilization over time. The step S20 of conditioning typically comprises heating and cooling the thermal buffer. Heating and cooling the thermal buffer may be carried out by alternately heating and cooling the thermal buffer. That is, alternatively heating and cooling the thermal buffer over time. The operating window is typically defined by a lower temperature limit and an upper temperature limit, wherein the lower and upper temperature limits are varying as a function of the predictive power utilization over time.

In a first optional sub-step S22 to the second step S20, the heating and cooling of the thermal buffer is carried out by actively heating and actively cooling the thermal buffer, respectively. Additionally, or alternatively, for example in combination with alternatively heating and cooling the thermal buffer over time, in a second sub-step S24 of the second step S20, conditioning the thermal buffer in response to the predictive power utilization comprises intentionally allowing the thermal buffer to self-heat or self-cool for a predetermined time period.

In an optional sub-step S12 to the first step S10, a first point in time, or a first time interval, in which the thermal buffer is in need of heating in order to be within the operating window of the thermal buffer, and a second point in time, or a second time interval, in which the thermal buffer is in need of cooling in order to be within the operating window of the thermal buffer, are determined. The second point in time occurring after the first point in time, or the second time interval being separate and subsequent to the first time interval.

It should be noted that the naming of the steps not necessarily, but might according to at least one example embodiment, relate to the order in which the steps are carried out, unless explicitly stated otherwise. One or more of the steps may be combined and carried out simultaneously. The control unit 117 of FIG. 2 may be configured to carry out one or several of the steps S10-S24.

It is to be understood that the present invention is not limited to the embodiments described above and illustrated in the drawings; rather, the skilled person will recognize that many changes and modifications may be made within the scope of the appended claims.

Additionally, variations to the disclosed embodiments can be understood and effected by the skilled person in practicing the claimed inventive concept, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

The invention claimed is:

1. A method for thermal conditioning at least one thermal buffer of a thermal system of a vehicle, the thermal system being a rechargeable energy storage system, RESS, and/or an energy transformation system comprising fuel cells, and the thermal buffer being a rechargeable energy storage device or a fuel cell, the thermal buffer having an operating window defined by a preferred operating temperature of the thermal buffer and comprising a lower temperature limit and an upper temperature limit, the method comprising:

providing predictive power utilization of the thermal buffer as a function of time, wherein the predictive power utilization is comprised in scheduled operational information of the thermal buffer, conditioning the thermal buffer in response to the predictive power utilization, such that the thermal buffer is thermally conditioned to be within the operating window of the thermal buffer, wherein the operating window is varying as a function of the predictive power utilization over time such that the lower and upper temperature limits are varying as a function of the predictive power utilization over time and the lower temperature limit and the upper temperature limit define desired constraints for the operating window.

2. The method according to claim 1, wherein conditioning the thermal buffer in response to the predictive power utilization comprises heating and cooling the thermal buffer.

3. The method according to claim 2, wherein heating and cooling the thermal buffer is carried out by alternately heating and cooling the thermal buffer.

4. The method according to claim 2, wherein heating and cooling the thermal buffer is carried out by actively heating and actively cooling the thermal buffer, respectively.

5. The method according to claim 1, wherein conditioning the thermal buffer in response to the predictive power utilization comprises intentionally allowing the thermal buffer to self-heat or self-cool for a predetermined time period.

6. The method according to claim 1, further comprising: determining a first point in time, or a first time interval, in which the thermal buffer is in need of heating in order to be within the operating window of the thermal buffer, and determining a second point in time, or a second time interval, in which the thermal buffer is in need of cooling in order to be within the operating window of the thermal buffer.

7. The method according to claim 1, wherein the predictive power utilization of the thermal buffer is predicted in response to a scheduled route of the vehicle comprising scheduled auxiliary actions of performing work during at least a portion of the scheduled route.

8. A conditioning system for thermal conditioning at least one thermal buffer of a thermal system of a vehicle, the thermal system being a rechargeable energy storage system, RESS, and/or an energy transformation system comprising fuel cells, and the thermal buffer being a rechargeable energy storage device or a fuel cell, the thermal buffer having an operating window defined by the preferred operating temperature of the thermal buffer and comprising a lower temperature limit and an upper temperature limit, the conditioning system comprising:

a control unit configured to provide predictive power utilization of the thermal buffer as a function of time, the predictive power utilization being comprised in scheduled operational information of the thermal buffer, a conditioning unit configured to condition the thermal buffer in response to the predictive power utilization, such that the thermal buffer is thermally conditioned to be within the operating window of the thermal buffer, wherein the operating window is varying as a function of the predictive power utilization over time such that the lower and upper temperature limits are varying as a function of the predictive power utilization over time and the lower temperature limit and the upper temperature limit define desired constraints for the operating window.

9. The conditioning system according to claim 8, wherein the conditioning unit is configured to condition the thermal buffer by alternately heating and cooling the thermal buffer.

10. The conditioning system according to claim 8, wherein the control unit is further configured to:

determine a first point in time, or a first time interval, in which the thermal buffer is in need of heating in order to be within the operating window of the thermal buffer, and determine a second point in time, or a second time interval, in which the thermal buffer is in need of cooling in order to be within the operating window of the thermal buffer.

11. A vehicle comprising the conditioning system according to claim 8.

12. A non-transitory computer readable medium storing a computer program comprising program code for performing the method according to claim 1, when the program code is run on a computer.

13. The method according to claim 1, wherein the operating window in a second point in time and which is based on the predicted power utilization is used as input to at least partly determine the conditioning of the thermal buffer in a first point in time occurring prior to the second point in time.

14. The method according to claim 1, wherein, the operating window is varying as a function of the predictive power utilization over time to determine an operating window in a first point in time, being a first operating window, and an operating window in a second point in time, being a second operating window, and wherein the thermal buffer is thermally conditioned to be within the first operating window at the first point in time, wherein the conditioning at the first point in time is at least partly adapted in response to the second operating window.

15. The method according to claim 1, wherein the upper and lower temperature limits defines the normal operation limits of the thermal buffer.

16. The method according to claim 1, wherein the upper and lower temperature limits defines stretched, or critical operation limits of the thermal buffer.

17. The method according to claim 1, wherein the operating window is defined by at least two upper temperature limits and/or at least two lower temperature limits, and wherein a first upper and lower temperature limits represent normal operation of the thermal buffer, while second upper and lower temperature limits represent stretched, or critical operation of the thermal buffer.

* * * * *